United States Patent
Balasubramanian et al.

(10) Patent No.: US 9,426,109 B1
(45) Date of Patent: Aug. 23, 2016

(54) SELECTIVE FORWARDING OF COMPONENTS OF AN ATTACHED ARCHIVE IN EMAIL SYSTEM

(71) Applicant: International Business Machines Corporation, Armonk, NY (US)

(72) Inventors: Swaminathan Balasubramanian, Troy, MI (US); Ravi P. Bansal, Tampa, FL (US); Sandip D. Mahajan, Nagpur (IN); Haaris A. Shaikh, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/071,261

(22) Filed: Mar. 16, 2016

Related U.S. Application Data (63) Continuation of application No. 14/672,539, filed on Mar. 30, 2015.

(51) Int. Cl.
*G06F 15/16* (2006.01)
*H04L 12/58* (2006.01)

(52) U.S. Cl.
CPC ............... *H04L 51/08* (2013.01); *H04L 51/14* (2013.01)

(58) Field of Classification Search
USPC ......... 709/203, 204, 206, 217, 219, 223, 224, 709/226, 228, 232, 238
See application file for complete search history.

(56) References Cited

U.S. PATENT DOCUMENTS

| | | | | |
|---|---|---|---|---|
| 6,505,237 B2* | 1/2003 | Beyda | ................ | G06Q 10/107 370/352 |
| 7,409,425 B2 | 8/2008 | Naick et al. | | |
| 8,838,710 B2* | 9/2014 | Singh | ................ | H04L 51/14 709/206 |
| 9,319,367 B2* | 4/2016 | Zeng | ................ | H04L 51/22 |
| 2002/0016818 A1* | 2/2002 | Kirani | ................ | G06F 17/30902 709/203 |
| 2002/0112010 A1 | 8/2002 | Soroker et al. | | |
| 2005/0015721 A1 | 1/2005 | Tsai | | |
| 2005/0160149 A1 | 7/2005 | Durand et al. | | |
| 2006/0277260 A1 | 12/2006 | Hardy, Jr. | | |
| 2008/0028017 A1* | 1/2008 | Garbow | ................ | G06Q 10/107 709/201 |
| 2009/0292780 A1* | 11/2009 | Ramesh | ................ | G06Q 10/107 709/206 |
| 2012/0233227 A1 | 9/2012 | Alexander et al. | | |
| 2014/0229471 A1* | 8/2014 | Galvin, Jr. | .......... | G06F 17/3061 707/725 |

FOREIGN PATENT DOCUMENTS

EP     2448201 A1    5/2012

OTHER PUBLICATIONS

IBM, "Selective Attachment Forwarding in a Single Email Trace", IP.com No. IPCOM000138943D, Publication Date: Aug. 11, 2006, pp. 1-3.

Disclosed Anonymously, "Method for Selective email interchange", IP.com No. IPCOM000218918D, Publication date: Jun. 11, 2012, pp. 1-3.

Mell et al., "The NIST Definition of Cloud Computing", National Institute of Standards and Technology, Information Technology Laboratory, Version 15, Oct. 7, 2009.

(Continued)

*Primary Examiner* — Quang N Nguyen
(74) *Attorney, Agent, or Firm* — Michael J. DiCato; Kurt P. Goudy (57) ABSTRACT

A communication management system. A computer receives an electronic communication including an attachment and selectively forwards components of the attachment to multiple recipients based on associating the recipients with the components.

1 Claim, 5 Drawing Sheets

(56) References Cited

OTHER PUBLICATIONS

IBM: List of IBM Patents or Patent Applications Treated as Related (Appendix P), Apr. 4, 2016, pp. 1-2.

Balasubramanian et al., Pending U.S. Appl. No. 14/672,539, filed Mar. 30, 2015, titled "Selective Forwarding of Components of an Attached Archive in Email System," pp. 1-37.

* cited by examiner

SELECTIVE FORWARDING OF COMPONENTS OF AN ATTACHED ARCHIVE IN EMAIL SYSTEM

BACKGROUND

The present invention relates generally to the field of electronic communications, and more particularly to processing attachments in electronic communications.

As computer networks develop into a means of structuring, sharing and transferring information, information systems such as electronic mail (email) have facilitated communication and information management for information sharing and transfer. Users on a computer network have traditionally used email to communicate private messages with each other. However, email has evolved rapidly into a new standard communication medium, moving beyond the memo framework to becoming a universal tool for conducting business. Sending any type of data attached as a file to an email is a growing practice, not only for dissemination of information, but also as a means of real world collaboration. Email attachments have become a vital component of an organization's workflow.

Typically, organizations use a network of computers, with some computers operating as email servers to receive, transmit, route and archive email. Users of such a network typically have client versions of the email software installed locally for creating, sending, receiving and organizing emails. The size of email attachments used for collaboration varies considerably depending on the application but the trend is moving towards the use of larger files, especially for rich media applications involving audio and video.

Consequently, the volume of data passing through email systems has increased beyond the capabilities of the existing infrastructure of many networks, resulting in strained bandwidth networks, unmanageable growth in distributed storage requirements and an adverse impact on other critical communications.

Prior art approaches to this problem include: compressing attachments—users can compress attachment files into a single file; bundling attachments—users can bundle project specific files, for example, .java, .jsp, or .html, in a single file such as a Web Application Archive ("WAR") or an Enterprise Archive ("EAR"); and multi-TAB attachment—when sending project-specific data for different modules, users can segregate data by organizing the data in different TABS in, for example, a spreadsheet document.

SUMMARY

An embodiment of the invention includes a method for managing transmission of electronic communications having attachments. The method receives an electronic communication from a user; the electronic communication includes an attachment. The method identifies components of the attachment and assigns the components of the attachment to recipients in a list of recipients. The method sends the electronic communication to the recipients, where the electronic communication to a given recipient among the recipients includes the components of the attachment assigned to the given recipient.

A further embodiment of the invention includes a computer system for managing transmission of electronic communications having attachments. The system includes a computer device having a processor and a tangible storage device, and a program embodied on the storage device for execution by the processor. The program has a plurality of program instructions to perform the following functions, by the system. The system receives an electronic communication from a user. The electronic communication includes an attachment. The system identifies components of the attachment. The system assigns the components of the attachment to recipients in a list of recipients, and sends the electronic communication to the recipients. The electronic communication to a given recipient among the recipients includes the components of the attachment assigned to the given recipient.

A further embodiment of the invention includes a computer program product for managing transmission of electronic communications having attachments. The computer program product includes a tangible storage device having program code embodied therewith. The program code is executable by a processor of a computer to perform a method. The method receives an electronic communication from a user; the electronic communication includes an attachment. The method identifies components of the attachment and assigns the components of the attachment to recipients in a list of recipients. The method sends the electronic communication to the recipients, where the electronic communication to a given recipient among the recipients includes the components of the attachment assigned to the given recipient.

DETAILED DESCRIPTION

A limitation of the prior art is that although it allows a sending user to send multiple files as an archived or bundled attachment, the recipient user has to unarchive/unbundle them, and customize them, to forward the files to a different group of intended recipients. For example, a manager receives a project documents archive and wants to forward module specific documents to different project leads. The manager has to first unzip the archive, create different archives for each module, and forward different emails to different project leads. If a project lead receives a WAR file and wants to forward it to team members, he has to manually create custom attachments so that he can send .java files to Java developers, .jsp and .html files to UI developer, .jpg and .png to graphics designer, and so on.

As another example, if a manager receives a spreadsheet with ten TABs and wants to forward it to ten leads, he has to either break the spreadsheet into ten individual spreadsheets or send the same spreadsheet to all the intended recipients and explicitly mention in the mail which TAB is for which particular module.

Among other functions, embodiments of the invention selectively forward components of an attached archive or bundle to multiple intended recipients. A profile of each recipient is first used to determine if a component is relevant.

If relevant, next a determination is made as to whether the recipient has previously obtained the component. Based on these determinations, customized archives or bundles are created appropriate for each recipient. Embodiments of the invention provide the ability to customize a received attachment before forwarding by unbundling/unarchiving the received attachment, selecting different components/sections for different groups of intended recipients, and re-bundling/re-archiving the selected components/sections as custom attachments.

Figure 1:
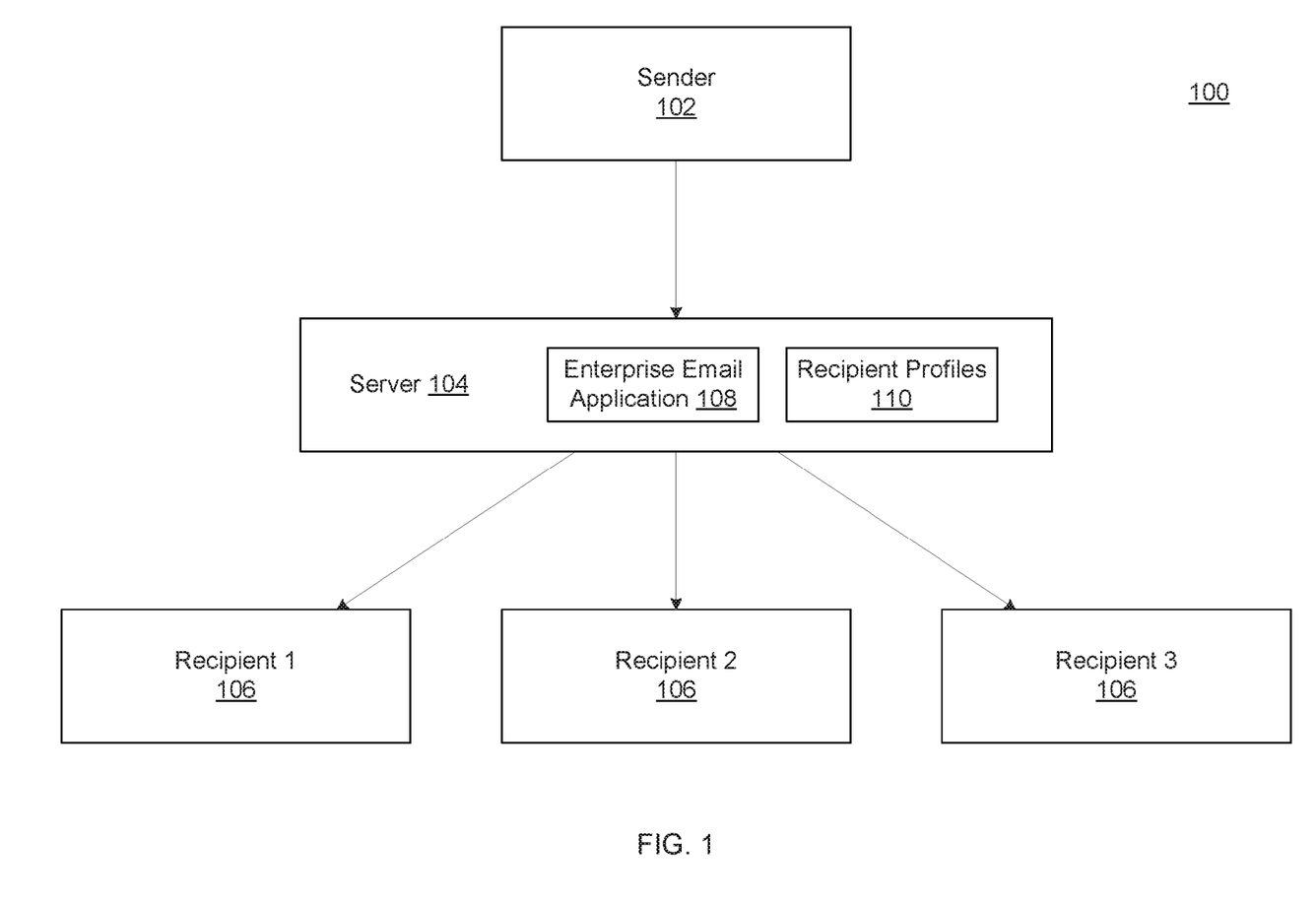
FIG. 1 is a block diagram of an electronic communication management system, according to an aspect of the invention.

FIG. 1 is a block diagram of an electronic communication management system, according to an aspect of the invention. The electronic communication management system may be, for example, enterprise email system 100, according to an embodiment of the invention. While enterprise email system 100 is described in the context of an enterprise email application having enterprise users, embodiments of the invention are not limited to such system, application, or users. The functions described apply equally to non-enterprise embodiments.

Enterprise email system 100 may include one or more computing devices, each of which may be a computing device as described in connection with FIG. 3, below, and may include a processor, and a computer program embodied on a tangible storage device, having program instructions executable by the processor. The computer program may be local to a one or more of the computing devices, or may be distributed across multiple devices. In some embodiments, enterprise email system 100 may be a virtual system, as described in connection with FIGS. 4 and 5, below.

In the depicted embodiment, enterprise email system 100 includes: a server 104 having an enterprise email application 108 and data corresponding to recipient profiles 110 embodied on a tangible storage device of the server; a sender 102 device ("sender 102"); and three recipients 106 devices ("recipients 106"), also referred to as Recipients 1-3. Each of server 104, sender 102, and recipients 106 may, but need not, be a computing device as described in connection with FIG. 3, below.

Generally, sender 102 may send an electronic communication, such as an email communication, including an attachment component to recipients 106 via server 104 using any email protocol known in the art. The email communication may also include a list of recipients 106. Alternatively, the list of recipients may be stored elsewhere (for example, sender 102 may simply send documents to enterprise email application 108; enterprise email application 108 may determine, based on the attachment, who should receive the email and the attachments). The attachment component may be an electronic file (such as text, image, audio, video, and other digital file types), and may include a single such file or multiple files. Where the attachment component includes multiple files, the multiple files may be archived or bundled. For example, the multiple files may be bundled using WAR or EAR file formats. Archiving or bundling of the multiple files may be performed by sender 102 prior to sending the email communication, or it may be performed by server 104 upon receipt, or both (sender 102 may send archived filed to server 104; server 104 may unarchive the files, and thereafter re-archive them).

Server 104 generally may receive the email communication from sender 102, and process and distribute the email communication to recipients 106 using enterprise email application 108. In one embodiment, sending the received email communication to recipients 106 may be based on the recipients' corresponding profiles, which may be a work profile, stored as recipient profiles 110 on a tangible storage device of server 104.

Recipient profiles 110 may include data associated with sender 102 and recipients 106. If the email communication received by server 104 includes an attachment having multiple components (or files), server 104 may match, based on recipient profiles 110 data, the multiple components to individual recipients 106. Profile data may include, for example, records of recipients and associated file formats, file sizes, file names, file encoding, and any other attachment property. For example, Recipient 1 may be associated with image file formats, whereas Recipient 2 may be associated with text and spreadsheet file formats; Recipient 3 may be associated with all file formats. Alternatively, profile data may include information about prior associations of a file having a certain set of properties (for example, size, format, or name) with a particular recipient 106. Enterprise email application 108 may also create or update prior association records where none exist or where an update is desired. In a related embodiment, each recipient 106 using enterprise email application 108 may be assigned a job role. Assignment of file formats to recipients 106 may be based on assignments of file formats to job roles. In one example, users of enterprise email application 108 may have the following job roles: project manager (associated with all file formats), graphic designer (associated with image file formats), and account representative (associated with text and spreadsheet documents). Enterprise email application 108 may assign files in the email attachment to recipients 106 based on their specified job roles in recipient profiles 110.

Although recipient profiles 110 in the above examples are described as being stored on server 104, they may be stored on another device. In another embodiment, they may be included as metadata in the email communication.

Enterprise email application 108 may include assignment rules data that provide the assignment policies described above. For example, the assignment rules may provide that files having .jpg and .png are image files and should be associated with graphic designers.

Server 104 may send the email communication to recipients 106. The email communication sent by server 104 may include, for each recipient 106, corresponding components of the attachment included in the email communication received by server 104. For example, Recipient 1 may receive the email communication with one or more components of the attachment. The one or more components included in the email communication are those assigned to Recipient 1, but do not include other components that are not assigned to Recipient 1. Server 104 may send the email communication to Recipients 2-3 in a similar fashion.

In one aspect of the invention, enterprise email application 108 may archive components of the attachment to be sent to recipients 106. This archiving may be independent of whether the components of the incoming email from sender 102 are archived.

According to an aspect of the invention, the attachment may be an archived or unarchived electronic file or set of files. In another embodiment, the attachment as a whole or a subset thereof may be compressed. The electronic files may include word processing documents, spreadsheet documents, presentation documents, image documents, video documents, executable files, web files (for example, html), programming files.

In a related embodiment, components of the attachment and/or the electronic file(s) therein that the enterprise email application 108 may identify and assign to recipients 106 may include delineated sections of electronic files. An electronic file may include data or metadata that identify and delineate sections within a file. For example, in a spreadsheet document, certain metadata may delineate boundaries of tabs or "sheets" within the spreadsheet document. Enterprise email application 108 may identify these components of the spreadsheet file, and assign them to recipients 106 as described above. In one example, each tab in a spreadsheet may include data pertaining to a specific project A-C. Recipient 1 may be associated with project A, Recipient 2 may be associated with project B, and Recipient 3 may be associated with projects A-C. Enterprise email application 108 may receive an email communication containing the spreadsheet document including the above referenced tabs, break up the document into three new spreadsheet files, and send each file to one of the three recipients 106 based on their associations with the spreadsheet tabs.

Figure 2:
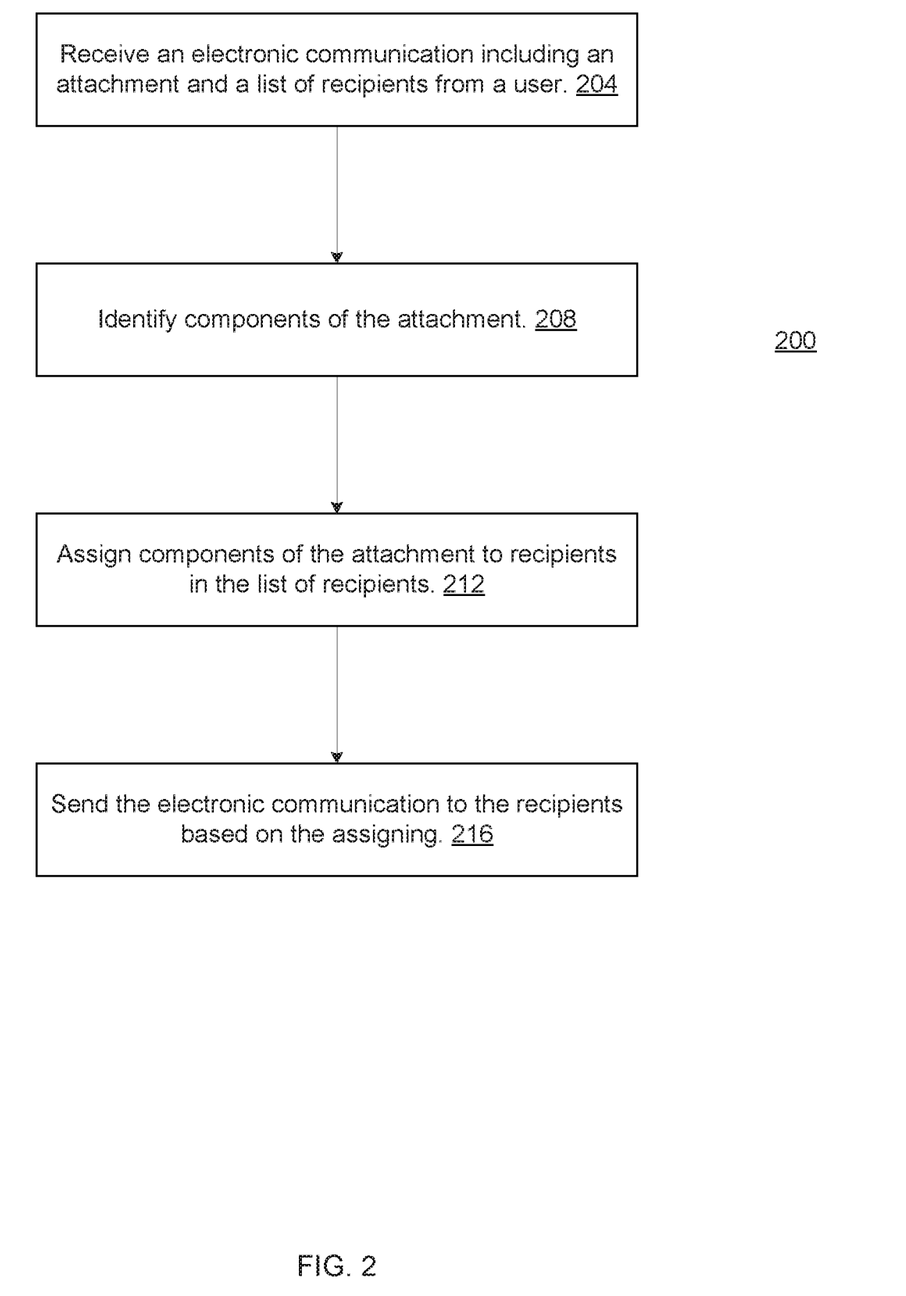
FIG. 2 is a flowchart of a method for managing electronic communications using, for example, the electronic communication management system of FIG. 1, according to an aspect of the invention.

FIG. 2 is a flowchart of a method 200 for managing electronic communications using, for example, the electronic communication management system of FIG. 1, according to an aspect of the invention. Method 200 may be implemented via program instructions embodied on a non-transitory tangible storage device, executed by a processor of a computing device. Method 200 may be implemented using, for example, enterprise email application 108 in FIG. 1.

Referring now to FIGS. 1 and 2, steps of method 200 are described in connection with components of enterprise email system 100. At step 204, enterprise email application 108 may receive an electronic communication from a user, for example, sender 102. The electronic communication may include an attachment. The attachment may be, for example, an electronic file. The attachment may be compressed and/or archived. In one example, the electronic communication may be an email communication.

At step 208, enterprise email application 108 may identify components of the attachment. If the attachment is compressed or archived, enterprise email application 108 may decompress or unarchive the attachment, as necessary. Components of the attachment may include constituent files of the attachments. In a related embodiment, components of the attachment may include delineated sections of an electronic file, such as tabs within a spreadsheet document (the tabs indicate the delineation) or sections within a word processing document (section headings may indicate the delineation). Other file types and delineators are contemplated (for example, each slide in a presentation file may be a separate section).

At step 212, enterprise email application 108 may assign the components of the attachment, determined at step 208, to recipients 106 in a list of recipients. The list of recipients may be included as part of the email communication (it may include, for example, a list of email addresses and associated data or metadata), or it may be stored in a database. Enterprise email application 108 may, therefore, determine who is to receive the attachment, or parts thereof, based on at least addresses in the email communication, or based on the attachment, or both.

Where the email communication includes a set of recipients, enterprise email application 108 may refer to a recipient profiles 110 to determine if one or more recipients 106 in the set of recipients have a corresponding profile. Enterprise email application 108 may assign components of the attachment to recipients 106 based on assignment rules provided in recipient profiles 110. If a recipient does not have a recipient profile 110 entry, enterprise email application 108 may forward components of the attachment to that recipient based on a default setting (the default setting may be, for example, to send all components). Enterprise email application 108 may create a record of the assigning, which may be used in subsequent assignment processes where enterprise email application 108 may use prior assignments to determine how to handle current assignments. Assignments may also be made by a user (for example, sender 102) making an assignment when sending the email communication to server 104, using, for example, a graphical user interface (GUI).

Where no recipient is indicated, enterprise email application 108 may determine who should receive email communication and its attachment components based on the components. For example, if an attachment includes a word processing document and an image document, enterprise email application 108 may determine, based on recipient profiles, that the word processing document should be sent to Recipient 1, and the spreadsheet document should be sent to Recipient 2.

At step 216, enterprise email application 108 may send the electronic communication to recipients 106 based on assignments determined at step 212. The electronic communication that is sent to a given recipient 106 at step 216 includes only those components of the attachment that are assigned to the given recipient. For example, if a graphic designer is assigned to receive only graphical electronic files (such as .jpg or .png files), enterprise email application 108 will send the email communication to the graphic designer with only the graphical electronic files.

Prior to sending the email communication, including its attachment, to recipients 106, enterprise email application 108 may archive, bundle, and/or compress the attachment (which may include fewer than all the components of the attachment received at step 204).

Referring now generally to FIGS. 1-2, the following are some examples of the functionality of enterprise email application 108, according to embodiments of the invention.

Enterprise email application 108 receives an email communication from sender 102. Sender 102 may attach one or more computer files to the email communication, and identify one or more recipients 106 to receive the email communication including part(s) or all of the attachment(s). In a related embodiment, sender 102 may be presented, via a user-interface component of sender's 102 email client with an option to select which recipient 106 among multiple recipients 106 receives which attachment or which components of the attachment.

Enterprise email application 108 may determine whether the email communication contains any attachments. If there are no attachments, enterprise email application 108 processes the email according to standard email protocols. If there is an attachment, enterprise email application 108 determines whether the attachment is archived or bundled, and unarchives or unbundles the attachment, such that it generates multiple computer files.

Enterprise email application 108 may list components of an archived/bundled attachment and the selection of different components for different groups of intended recipients. When a user receives an archived/bundled attachment and wants to forward different components of attachment to different intended recipients, the user may have an option such as "forward with custom attachment". When the user clicks on this option, a process may run in the background which will unarchive/unbundle attachment and display all the components on user's UI.

Enterprise email application 108 may list sections of an attachment (like tabs of a spreadsheet, parts of a video, etc.) and the selection of different sections for different groups of intended recipients. When the user receives an attachment and wants to forward different sections of attachment to different intended recipients, enterprise email application 108 may present the user with an option such as "forward with custom attachment". When the user clicks on this option, a background process will run which will break attachment into multiple sections and display all the sections on user's UI.

Enterprise email application 108 may list components/sections based on the intended recipient's work profile. The recipient's work profile and other factors will be taken into consideration while displaying attachment components/sections on the user's UI. For example: If the user received a WAR file and wants forward it to his team, the .java file will be listed on top for java developer, .jpeg listed on top for graphics designer etc.

Enterprise email application 108 may determine an intended recipient's previous association with the component. When relevant components are identified for forwarding, a determination is made for each recipient as to whether they have previously obtained the component. For example if a component is a file on a sharing network, the determination may be based on whether the recipient has previously downloaded the component version. Alternately if the component is a software development unit such as source code, the determination becomes whether the recipient has synchronized with the source repository.

Enterprise email application 108 may automatically re-archive/re-bundle custom attachments, or break original attachment into multiple custom attachments for different recipients. When a user is be done with component/section selection and clicks on send, the same background process may create archives/bundles for the selected components, or different spreadsheets for different recipients before forwarding mail. If the recipient is determined to be previously associated with a component in the attachment, then a pointer or link to the component may be created in place of the actual component.

For example, a user receives an email having a WAR attachment. The user may wish to forward different components of this attachment to different team members. The user will be provided with an option such as "forward with custom attachment". When the user clicks on this option, a background process may run, which will scan the attachment and perform various actions based on the attachment type like: unarchive the attachment, unbundle the attachment, break the attachment.

Since the user is receiving a WAR file as an attachment in this case, the background process will scan it and perform the unbundle operation.

While performing the unbundle operation, the background process may apply various rules like: work profile of the recipients, last received files by the recipients, collaboration history with sender.

In this example, the WAR file may contain .java, .html, and .jpg files. User A may be a java developer, User B may be a UI developer and User C may be a graphics designer.

After applying the rules as described above, the system may display WAR components using a user interface. The user may select the components in user interface that the user wants to forward to each recipient, and click on send button. The background process will collect the component information selected by the user, bundle them in separate archives (using a zipper function present in email system) and send it to User A, User B and User C. In this step, the process will also determine if the users have previously obtained any of the files, and if yes will convert the file into a link or pointer using known methods.

As a result, User A will receive all the java files, User B will receive all the jsp files, and User C will receive all the jpeg files. The user can also send jsp files to java developers and .jpeg files to UI developers if required.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows. Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows. Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 3:
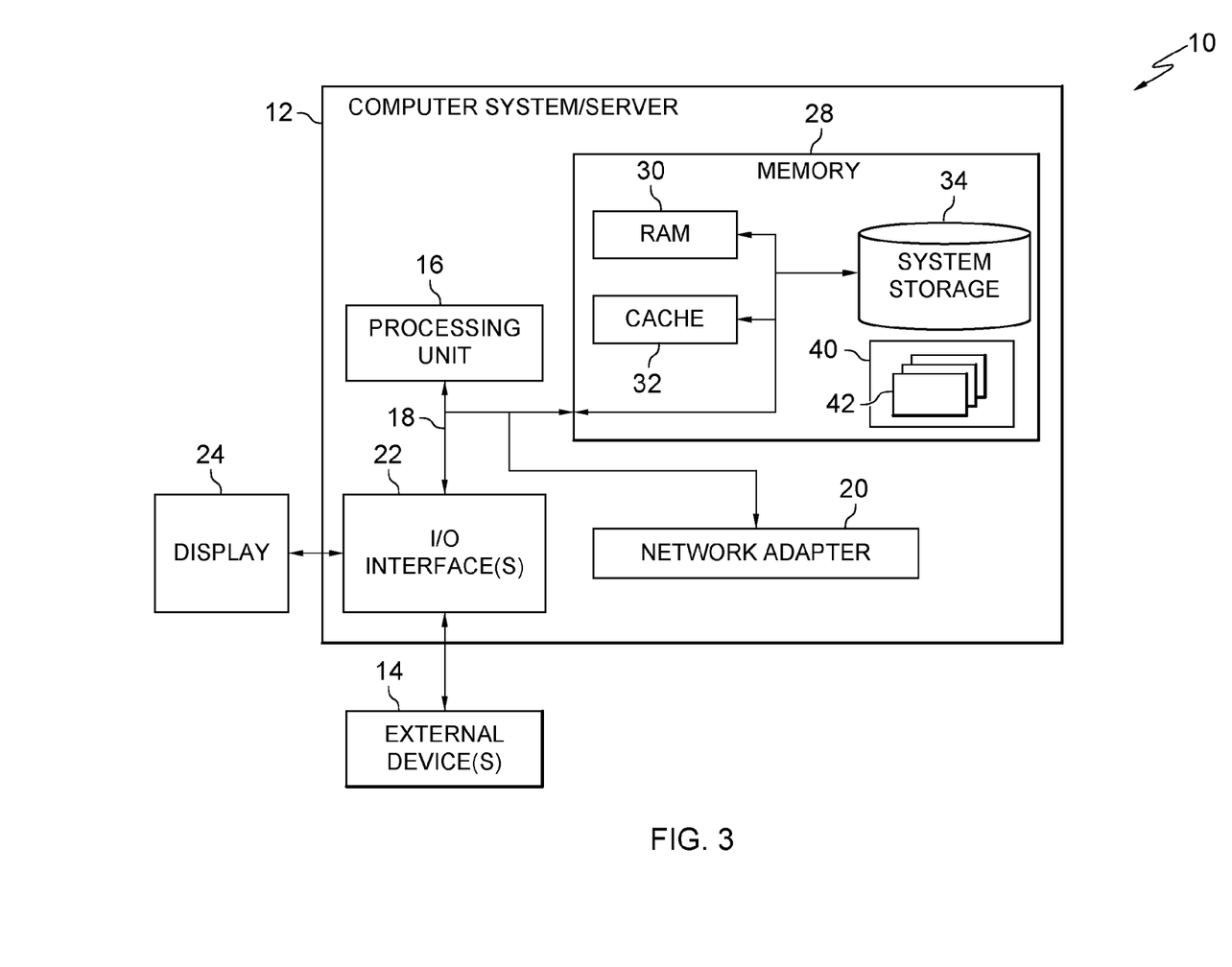
FIG. 3 is a block diagram of a general purpose computer, according to an aspect of the invention.

Referring now to FIG. 3, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 4:
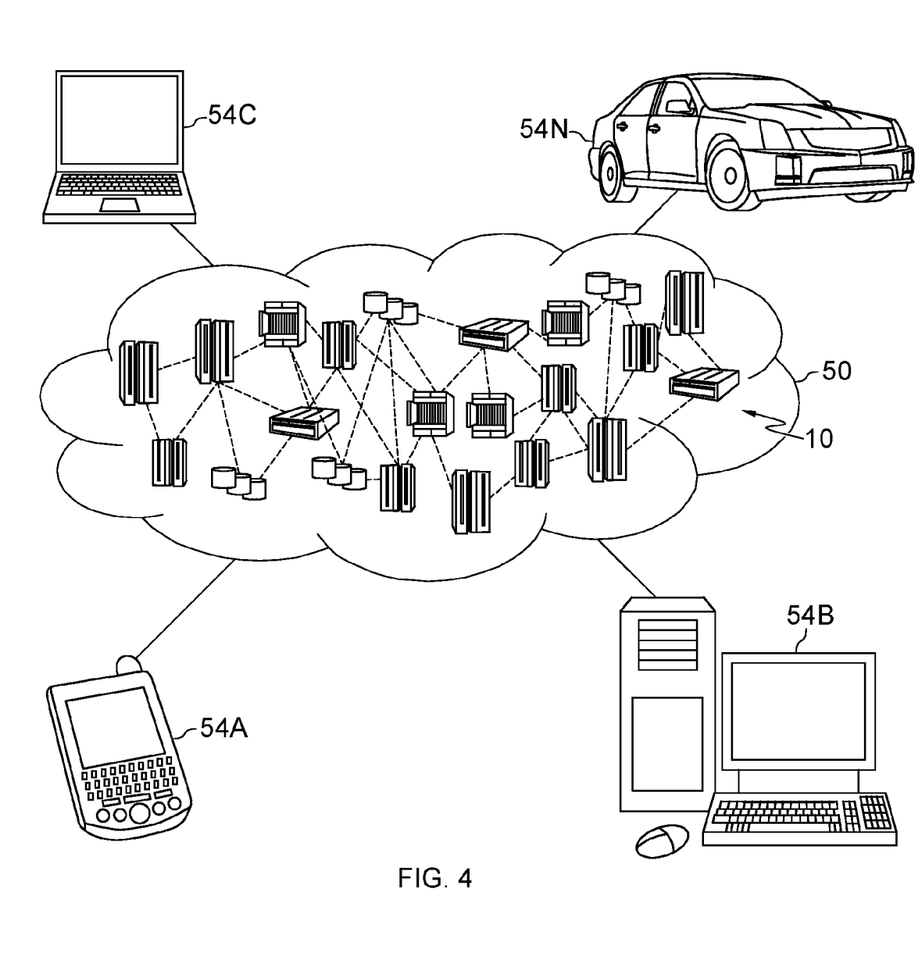
FIG. 4 is a block diagram of an illustrative cloud computing environment, according to an aspect of the invention.

Referring now to FIG. 4, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
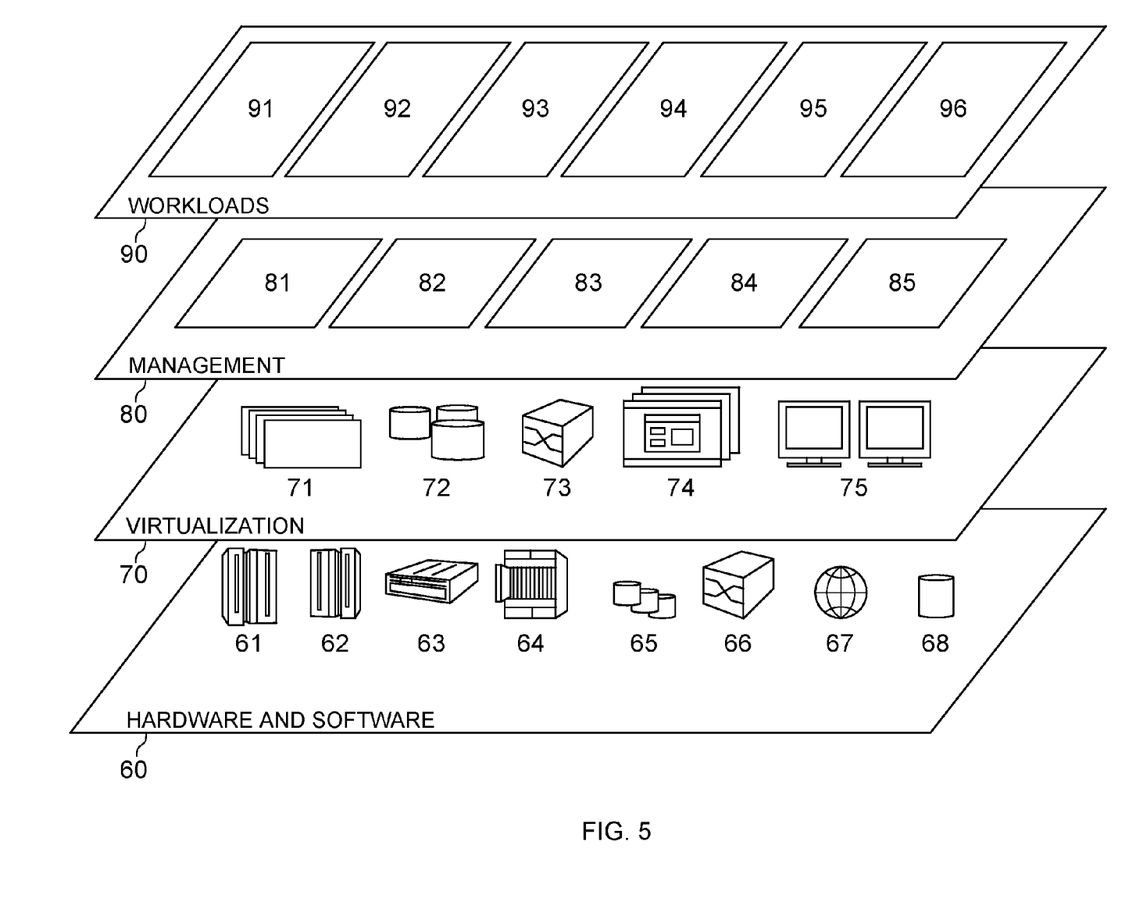
FIG. 5 is a block diagram of functional layers of the illustrative cloud computing environment of FIG. 4, according to an aspect of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and enterprise email application/services 96, such as those described in connection with FIGS. 1-2.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing transmission of electronic communications having attachments, comprising:
   receiving an electronic communication from a user, the electronic communication comprising an attachment having multiple components with associated file formats;
   assigning the multiple components of the attachment to recipients in a list of recipients comprising:
      determining one or more recipients from the list of recipients have corresponding profiles, and wherein each corresponding profile identifies a job role assigned to the one or more recipients; and
      assigning one or more components from the multiple components based on the associated file formats and the job role assigned to the one or more recipients; and
   sending the electronic communication to the recipients, wherein the electronic communication to a given recipient among the recipients includes the one or more components of the attachment assigned to the given recipient.

* * * * *